July 12, 1927.
V. G. JORNER
LATHE CHUCK
Filed Oct. 26, 1925
1,635,481
2 Sheets-Sheet 1
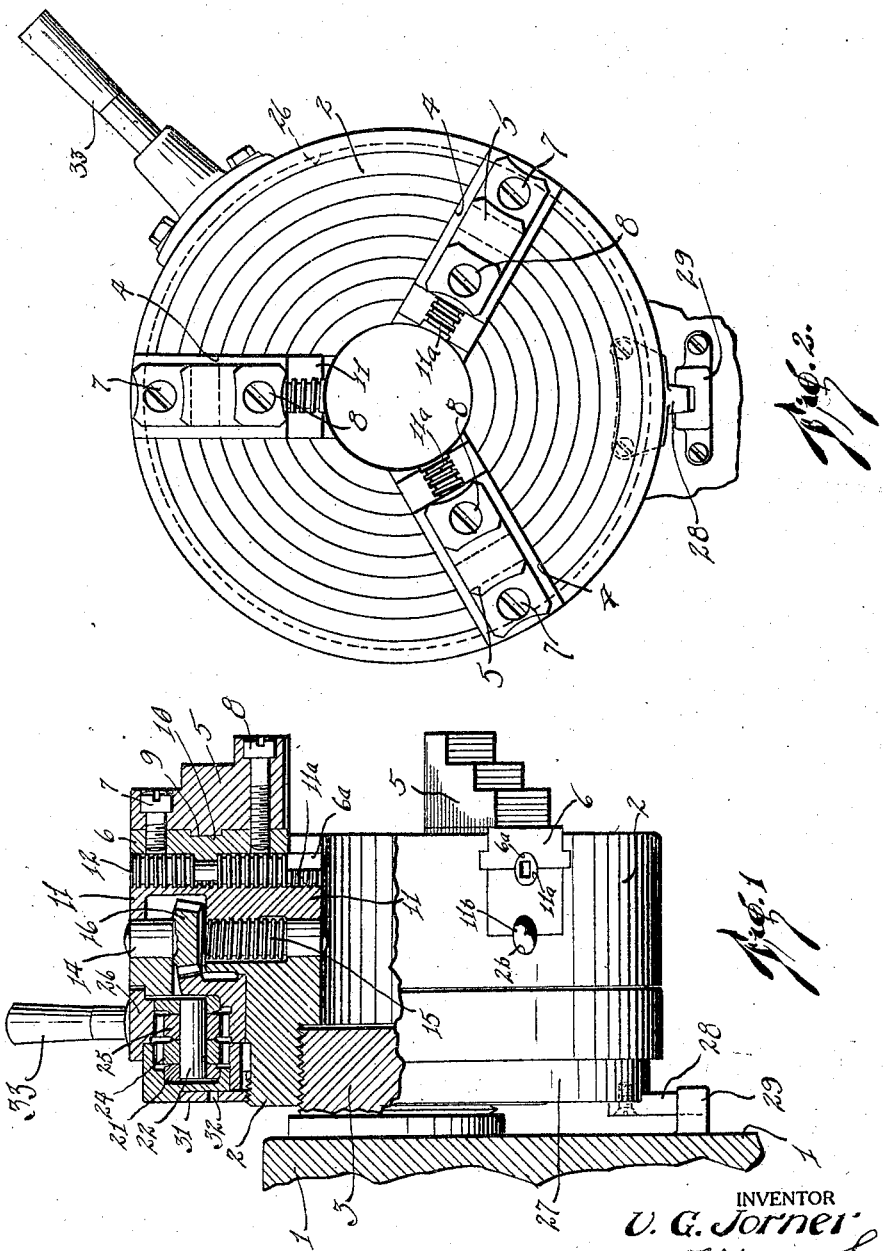
INVENTOR
V. G. Jorner
BY Munn &Co.
ATTORNEYS

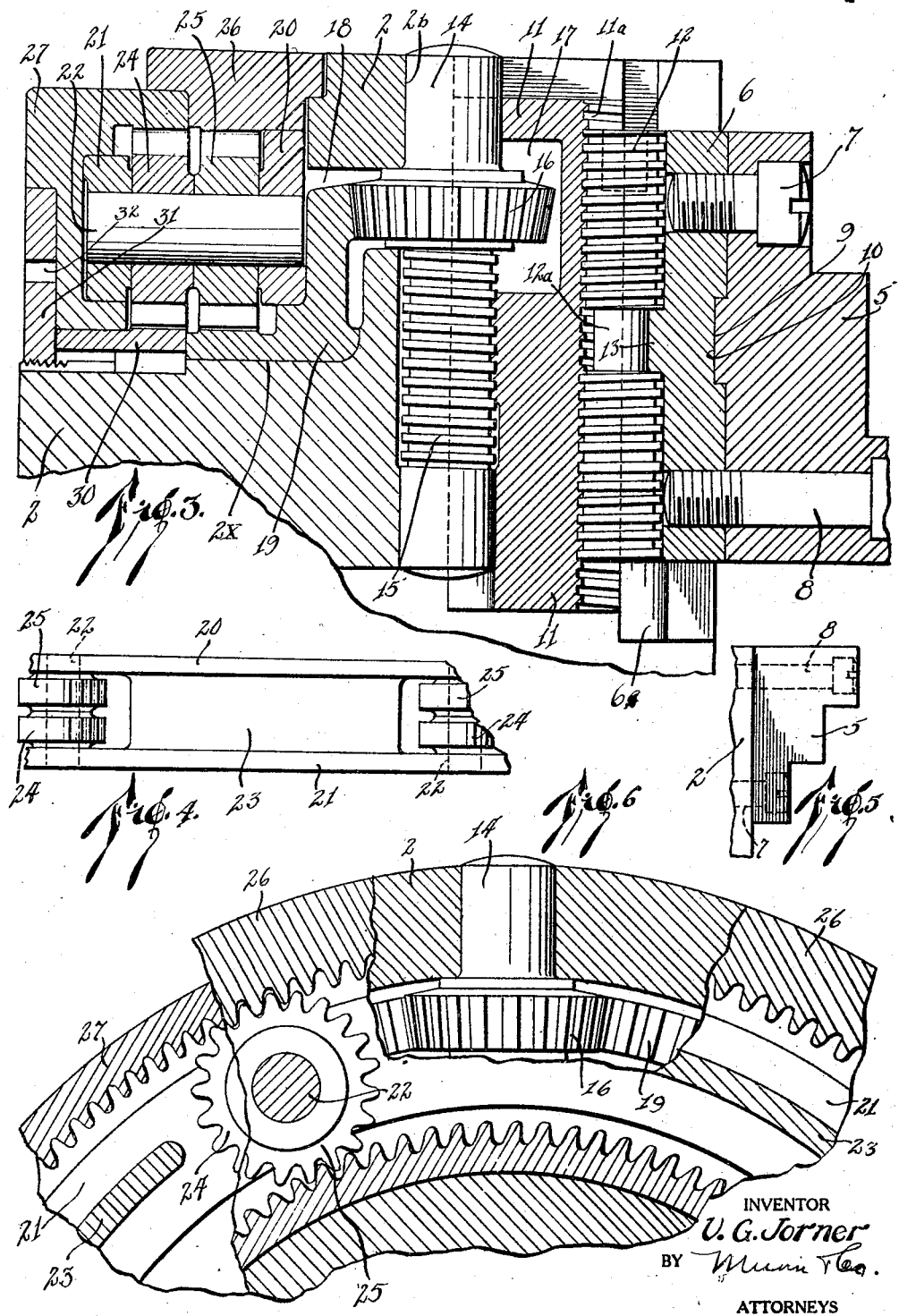

Patented July 12, 1927.

1,635,481

UNITED STATES PATENT OFFICE.

VICTOR G. JORNER, OF CHICAGO, ILLINOIS.

LATHE CHUCK.

Application filed October 26, 1925. Serial No. 65,020.

My invention relates to improvements in lathe chucks, more particularly in reference to the so-called wrenchless chucks, in which the jaws of the chuck are moved simultaneously by a handle carried by the chuck, and it consists in the combinations, constructions, and arrangements herein described and claimed.

An object of my invention is to provide a device in which there is greater power in the gripping action of the chuck, with a given pull on the handle, than with the ordinary chuck of the type which works on a cam principle.

A further object of my invention is to provide a device of the type described which will positively grip the work and hold it securely, and yet which may be instantly and easily released by a movement of the handle, and which will not stick, as is the case in devices of the type which work on the cam principle.

A further object of my invention is to provide a device of the type described having relatively few parts, thus rendering the device less liable to get out of order, and furthermore, rendering it more economical to manufacture.

Other objects and advantages will appear in the following specification, and the novel features of the invention will be particularly pointed out in the appended claims.

My invention is illustrated in the accompanying drawings, forming part of this application, in which Figure 1 is a side view, partly in section, of one embodiment of my chuck.

Figure 2 is a face view of the chuck shown in Figure 1,

Figure 3 is an enlarged sectional detail view similar to that shown in Figure 1, showing the jaw in a shifted position, Figure 4 is an edge view of a portion of a gear-bearing spider, Figure 5 is a side view of one of the jaws, showing it in a reverse position, and Figure 6 is an enlarged sectional view showing the interior mechanism, certain parts being broken away for the sake of clearness.

In carrying out my invention, I make use of any ordinary lathe head, such as indicated at 1, the body portion 2 of the chuck being screwed to the lathe spindle 3, as shown in Figure 1. At three points, 120° apart, are inwardly extending slots in the body portion, as indicated in Figure 2, at 4, to provide for the slidable jaw members.

Referring now particularly to Figures 1 and 3, it will be seen that these jaws comprise a stepped portion 5 which is held to a slidable block 6 by means of screw bolts 7 and 8, respectively. The slidable block 6 is of the shape shown at the bottom of Figure 1. It will be observed that there is a groove 9 which runs transversely of the block 6 into which a tongue 10 of the jaw 5 extends. This is for the purpose of forming a holding means in addition to the bolts 7 and 8. The block 6 is of a T-shape, as shown in Figure 1, and is provided with a semi-cylindrical recess 6ª, see Figure 1, arranged to register with a similar semi-cylindrical recess 11ª in a back jaw 11. The latter has a semi-cylindrical recess 11ᵇ arranged to register with a semi-cylindrical recess 2ᵇ in the body portion of the chuck. The semi-cylindrical recess 11ª is threaded to receive the threads of an adjusting screw 12. The latter is provided with a reduced portion 12ª into which a tongue 13 of the slidable block 6 enters. It will be seen that any rotation of the screw 12 will cause a corresponding movement of the slidable block and the jaw portion 5 connected thereto.

Disposed in the registering semi-cylindrical openings 2ᵇ and 11ᵇ is a head 14 of a screw 15 bearing a gear 16 which is adapted to turn in cutaway portions 17 and 18 of the back jaw 11 and the chuck body portion 2, respectively, being prevented from longitudinal movement by its engagement with the walls of the recess 18, as is clearly shown in Figure 3. The walls of the back jaw 11 are threaded to engage with the threads of the screw 15.

The body of the chuck has a cylindrical portion 2ˣ upon which is mounted a gear 19 which is arranged to mesh with the gear 16. Surrounding this gear is the inner portion 20 of a spider. The outer portion 21 of the spider is connected to the portion 20 by pins 22 and also by webs 23, see Figure 4. Upon these pins are mounted spur gears 24 and 25, respectively. There are a number of sets of these gears 24 and 25, two of them being indicated in Figure 4.

Encircling the spider portion 20 is an internal ring gear 26 arranged to mesh with the gear 25. An internal gear 27 has teeth arranged to mesh with the gear 24 and is recessed to receive the spider portion 21. This gear 27 has attached to it a dog 28 arranged to enter between the fingers 29 of the lathe block 1 so as to keep the gear 27 from turning. At 30 I have shown a hub gear which is keyed to the body portion 2 of the chuck and which engages the gear 24. A nut 31 is screwed on to the body portion 2 which is provided with openings 32 by means of which a spanner wrench may be used for screwing the nut on or off.

From the foregoing description of the various parts of the device, the operation thereof may be readily understood. As will be observed from Figure 1, the ring gear 26 is provided with a handle 33. The construction involves the use of planetary gearing. Consider now conditions when the lathe is idle and the handle is moved outwardly from the plane of the paper shown in Figure 1. This will turn the ring gear 26, which will cause a movement of the gear 25 around the pin 22. The latter is stationary, being held so by the engagement of the teeth of the gear 24 with the teeth of the ring gear 27 on one side, and with the teeth of the hub gear 30 on the other. The rotation of the gear 25 will drive the gear 19 in the opposite direction from the gear 26, and will turn the gear 16 and hence the screw 15, thus causing the back jaw 11 to move inwardly and to carry with it the parts attached thereto, i. e., the screw 12, the slidable block 6, and the jaw members 5.

As shown in Figure 2, there are three sets of these jaw members which are operated simultaneously by similar sets of apparatus actuated by the common ring gear 26.

The turning of the spindle 3 will cause the rotation of the chuck body 2. The gear 27 is held stationary, and in this instance, the gear 24 will rotate between the hub gear 30 and the gear 27 due to planetary gearing. The gear 26 remains stationary, the gear 19 revolves with the body, and the gear 25 revolves between the gears 26 and 19. The gears 25 and 24 being mounted on the spider, revolve between the stationary gears 26 and 27 and the revolving gears 19 and 30, and the spider revolves in relation to the stationary and revolving gears.

When it is desired to adjust the jaw members 5, it may be done by turning the adjusting screw 12 which will cause an inward or outward movement, according to the direction in which the adjusting screw is turned.

The slidable members 5 are reversible, as shown in Figure 5, in which the longer bolt 8 is at the top and the shorter bolt 7 at the bottom.

The arrangements described provides a means for accurately moving the jaws simultaneously, and to the same extent, by the movement of the handle or lever 33. Unlike the devices of the type which operate on the cam principle, the present device provides means for instantly releasing the work. In those devices which operate on the cam principle, it has been found necessary to use a tool to strike the handle, since there is a wedging action in devices which operate on the cam principle, which is absent in the present structure. The arrangement of the gears forms a means by which powerful pressure may be exerted to firmly clamp the work.

I claim:

1. A lathe chuck comprising a body portion, a plurality of jaw actuating screws carried by said body portion, a gear carried by each jaw actuating screw, a driving gear mounted for rotation on said chuck body and arranged to simultaneously actuate each of said first named gears, a ring gear, and intermediate planetary gearing between said ring gear and said driving gear for transmitting the movement of the ring gear to the driving gear to regulate the position of the jaws, said planetary gearing permitting the rotation of the chuck body, irrespective of the position of the jaws.

2. A lathe chuck comprising a body portion, a plurality of jaw-actuating screws carried by said body portion, a gear carried by each jaw-actuating screw, a driving gear mounted for rotation on said chuck body and arranged to simultaneously actuate each of said first named gears, a stationary gear, a ring gear movable relative thereto and provided with a handle, and planetary gearing associated with said stationary gear and said ring gear for transmitting movement of the ring gear to the driving gear to regulate the position of the jaws, said planetary gearing permitting the rotation of the chuck body, irrespective of the position of the jaws.

VICTOR G. JORNER.